United States Patent Office 3,277,147
Patented Oct. 4, 1966

3,277,147
LOWER ALKYL ESTERS OF β-CYCLOCITRYLI-
DENE FLUOROACETIC ACID AND β-IONYL-
IDENE FLUOROACETIC ACID
Hans Machleidt, Bonn, Richard Wessendorf, Erpel, and
Günter Strehlke, Mulheim (Ruhr), Germany, assignors
to Olin Mathieson Chemical Corporation, New York,
N.Y., a corporation of Virginia
No Drawing. Filed June 5, 1963, Ser. No. 285,591
3 Claims. (Cl. 260—468)

This invention relates to a series of novel fluorinated compounds which have biological activity and/or are useful as intermediates for the preparation of biologically active materials and also to novel processes involved in their production.

It has been found that carbo(hydrocarbonoxy)-fluoromethyl phosphonic acid esters of the formula (I)
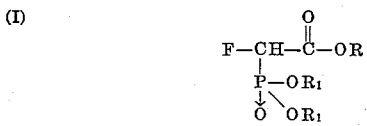

can readily be prepared in high yield by reacting bromofluoroacetic acid esters with trialkyl phosphites, such as triethyl phosphite, even though attempts to react phosphites with dichloroacetic acid esters or bromochloroacetic acid esters are notably unsuccessful. The reaction proceeds as follows:

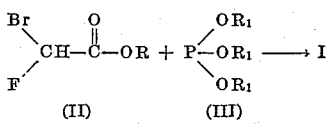

The starting material of Formula II may be obtained by reacting a diazoacetic acid ester such as ethyl diazoacetate with a brominating agent such as N-bromosuccinimide in the presence of hydrogen fluoride in an inert polar solvent at a temperature of about −70° to 0° centigrade as more particularly described in the copending application Serial No. 285,590, filed simultaneously herewith, now Patent No. 3,151,152 by Richard Wessendorf, Hans Machleidt and Michael Klockow.

In the above formulas R represents lower alkyl (which is preferred), cycloalkyl, aryl and aralkyl. $R_1$ represents lower alkyl groups which may be the same or different in a given compound.

The lower alkyl groups represented by the symbol $R_1$ are straight or branched chain aliphatic groups such as methyl, ethyl, propyl, isopropyl, butyl, t-butyl and the like. The cycloalkyl groups which $R_1$ represents are saturated alicyclic groups having 3 to 7 carbon atoms such as cyclopropyl, cyclobutyl, cyclopentyl, cyclohexyl and cycloheptyl. The aryl groups are phenyl and phenyl containing 1 to 3 groups such as halogen, lower alkyl and lower alkoxy on the ring, e.g., bromophenyl, chlorophenyl, 3,5-dichlorophenyl, o-, m- and p-tolyl, 4-methoxyphenyl, etc. The aralkyl groups represented by $R_1$ are made up of phenyl or substituted phenyl groups attached to lower alkyl groups, both of the character already described, including benzyl, phenethyl, 4-chlorobenzyl, etc.

The reaction of the bromofluoroacetic acid ester with the phosphite is carried out by mixing the reactants, preferably in equimolar ratio, and heating at a temperature above about 110° C., preferably about 140 to 150° C. If desired, the alkyl bromide produced can be isolated.

The fluorinated product is isolated by conventional techniques, e.g., by distillation.

The phosphites of Formula I will condense with carbonyl compounds to produce novel fluorosubstituted unsaturated carboxylic acid esters as follows:

(I) 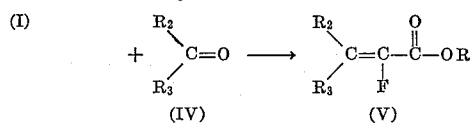
(IV) (V)

R in Formula V has the same meaning as above. $R_2$ represents hydrogen, alkyl, cycloalkyl, alkenyl, cycloalkenyl or aryl, $R_3$ represents hydrogen, cycloalkyl, cycloalkenyl, $R_4$-alkyl and $R_4$-alkenyl and $R_4$ represents hydrogen, fluorine, carbalkoxy, or a substituted amine. No more than one of $R_2$ and $R_3$ is hydrogen.

The alkyl groups represented by the symbols $R_2$ and $R_3$ are straight or branched chain aliphatic groups having up to about 16 carbon atoms, e.g., methyl, ethyl, propyl, isopropyl, butyl, hexyl, heptyl, octyl, isooctyl, decyl, dodecyl and the like.

The symbols $R_2$ and $R_3$ also represent unsaturated groups of the same character and chain length and include unsaturated chains having 1, 2 or 3 double bonds in the groups, e.g., allyl, crotonyl, butadienyl, octadienyl, decenyl, dodecenyl, dodecadienyl, dodecatrienyl, etc.

The alkyl and alkenyl groups represented by $R_3$ may also be substituted on one of the carbons by a fluorine atom, a carbalkoxy group, preferably a carbo-lower alkoxy group such as carbomethoxy, carbethoxy and the like, or by a substituted amino group (VI) 

wherein the symbols $R_5$ represent hydrogen (not more than one $R_5$ is hydrogen), lower alkyl, hydroxy-lower alkyl or lower alkoxy-lower alkyl, or the whole group including the nitrogen is a heterocyclic group such as pyrrolidino, piperidino, morpholino, piperazino, homopiperazino and the like.

The cycloalkyl groups represented by the symbols are 3 to 7 membered alicyclics including cyclopropyl, cyclobutyl, cyclopentyl, cyclohexyl and cycloheptyl and the cycloalkenyl groups are the corresponding unsaturated alicyclics having one or two double bonds.

The aryl groups represented by $R_2$ are phenyl and phenyl containing 1 to 3 groups such as halogen, lower alkyl and lower alkoxy on the ring, e.g., bromophenyl, chlorophenyl, 3,5-dichlorophenyl, o-, m- and p-tolyl, p-methoxyphenyl, etc.

The novel compounds of Formula V are prepared by the condensation of an appropriate carbonyl compound with a carbo(hydrocarbonoxy)fluoromethyl phosphonic acid ester in the presence of a base.

Suitable bases are alkali metals such as sodium, metallic hydrides such as alkali metal hydrides like sodium hydride and sodium borohydride, and akali metal alkoxides such as sodium ethoxide. The reaction may be advantageously carried out in a solvent such as ether, tetrahydrofuran, dioxane, dimethylformamide, Diglyme, benzene or mixtures of these solvents. The reaction can be carried out at a temperature between about 0° and 80°. The reaction is completed within several hours, usually between about 3 and 10 hours upon standing at room temperature or by refluxing the solvent. The reaction mixture is worked up by the addition of water and the desired product is isolated by extraction or filtration.

The new compounds of Formula V have hypocholesteremic activity and are orally effective for inhibiting cholesterol biosynthesis and for regulating the cholesterol level in the blood in conditions such as atherosclerosis.

These compounds of Formula V may also be reduced to alcohols of the formula (VII)
$$\begin{array}{c} R_2 \\ \phantom{R_2}\diagdown \\ \phantom{R_2R_2}C{=}C{-}CH_2OH \\ \phantom{R_2}\diagup\phantom{CC}| \\ R_3\phantom{CCCC}F \end{array}$$

wherein $R_2$ and $R_3$ have the same meaning as defined above, with lithium aluminum hydride or the like in ether. For example, the reduction of the corresponding $C_5$, $C_{10}$, and $C_{15}$ ethyl esters yields α-fluoro-β,β-dimethylallyl alcohol, α-fluorogeraniol and α-fluorofarnesol, respectively.

The alcohols of Formula VII, in turn, may be oxidized to the corresponding aldehydes of the formula (VIIa)
$$\begin{array}{c} R_2 \\ \phantom{R_2}\diagdown \\ \phantom{R_2R_2}C{=}C{-}CHO \\ \phantom{R_2}\diagup\phantom{CC}| \\ R_3\phantom{CCCC}F \end{array}$$

The oxidation of the alcohol to the aldehyde may be effected with an oxidizing agent such as activated manganese dioxide in an inert organic solvent such as petroleum ether or chloroform at room temperature or above for an extended period of up to 10 days. The oxidation process may be advantageously monitored and controlled by gas chromatography. Upon completion of the reaction, the manganese dioxide is filtered off and the product recovered from the filtrate, e.g., by distillation. Preferably all operations are carried out in an inert atmosphere, e.g., under nitrogen.

These aldehydes are useful as intermediates for the production of longer chain fluorinated unsaturated compounds, especially fluorinated compounds of the vitamin A series as shown hereinafter.

The compounds of Formula V above when brominated may be reacted with a trialkyl phosphite to form phosphonates which lead to fluorinated unsaturated compounds which are physiologically active or are useful as intermediates for such compounds, e.g., leading to fluorinated vitamin A compounds.

Thus the compounds of Formula V wherein $R_3$ is methyl may be brominated to form bromomethyl compounds as follows:

$$\begin{array}{c} CH_3 \phantom{CCC} O \\ \diagdown \phantom{CCC} \| \\ C{=}C{-}C{-}OR \\ \diagup \phantom{C} | \\ R_2 \phantom{CC} F \end{array} \longrightarrow \begin{array}{c} Br{-}CH_2 \phantom{CC} O \\ \diagdown \phantom{CCCC} \| \\ C{=}C{-}C{-}OR \\ \diagup \phantom{CCC} | \\ R_2 \phantom{CCC} F \end{array}$$
$$(V) \phantom{CCCCCCCCC} (Va)$$

The bromination may be effected with a brominating agent such as N-bromosuccinimide or N-bromoacetamide in the presence of an activator such as azobutyronitrile in an inert polar solvent such as carbon tetrachloride.

The bromofluoro compounds of Formula Va then will react with trialkylphosphites, in the same manner as described previously in connection with the products of Formula I (except that a temperature as low as 70° C. may be used), to produce compounds of the formula (VIII)
$$\begin{array}{c} \phantom{CCCCC} F \phantom{CC} O \\ \phantom{CCCCC} | \phantom{CC} \| \\ CH_3{-}C{=}C{-}C{-}OR \\ \phantom{CCCC} | \\ \phantom{CCCC} CH_2 \\ \phantom{CCCC} | \\ \phantom{CCCC} P{-}OR_1 \\ \phantom{CCCC} \downarrow \diagdown \\ \phantom{CCCC} O \phantom{C} OR_1 \end{array}$$

Unsaturated bromomethylcrotonic acid esters of the formula (IX)
$$\begin{array}{c} F \phantom{CCC} CH_2X \phantom{CC} O \\ \diagdown \phantom{CCC} | \phantom{CCC} \| \\ CH{-}C{=}CH{-}C{-}OR \\ \diagup \\ Br \end{array}$$

wherein X is hydrogen or fluorine, are also useful for the preparation of fluorinated compounds of the type discussed previously.

These bromomethylcrotonic acid esters are prepared from β-fluoromethylcrotonic acid esters of the formula (X)
$$\begin{array}{c} \phantom{CCCC} CH_2X \phantom{CC} O \\ \phantom{CCCC} | \phantom{CCC} \| \\ F{-}CH_2{-}C{=}CH{-}C{-}OR \end{array}$$

by bromination with N-bromoamides, e.g., N-bromosuccinimide or N-bromoacetamide in an inert solvent as carbon tetrachloride, preferably in the presence of a radical donor, e.g., azoisobutyronitrile. The bromination occurs surprisingly exclusively at the terminal fluorine substituted carbon instead of not at all or also at the methyl group as might have been expected.

The esters of Formula X are produced, for example, by reacting a bromoacetic acid ester such as ethyl bromoacetate with triphenyl phosphine and then treating the reaction product with fluoroacetone to obtain ethyl β-fluoromethylcrotonate or with 1,3-difluoroacetone to obtain β-fluoro-β-fluoromethyl crotonic acid ethyl ester.

The compounds of Formula IX will react with trialkyl phosphites, such as triethyl phosphite, to form products of the formula (XI)
$$\begin{array}{c} F \phantom{CCC} CH_2X \phantom{CC} O \\ | \phantom{CCCC} | \phantom{CCC} \| \\ CH{-}C{=}CH{-}C{-}OR \\ | \\ P{-}OR_1 \\ \downarrow \diagdown \\ O \phantom{C} OR_1 \end{array}$$

which also serve as intermediates for the production of fluorinated compounds discussed previously.

The compounds of Formula XI are produced by reacting the intermediates of Formula IX with a trialkyl phosphite at a temperature above about 100° C., preferably about 140° to 150° C., for several hours. The products may be isolated by conventional techniques such as by distillation.

Additional fluorinated phosphonates leading to fluoro isoprenols and fluoro vitamin A compounds are compounds of the formula (XII)
$$\begin{array}{c} \phantom{CCCC} CH_2F \phantom{CC} O \\ \phantom{CCCC} | \phantom{CCC} \| \\ H_2C{-}C{=}CH{-}C{-}OR \\ \phantom{CCCC} | \\ \phantom{CCCC} P{-}OR_1 \\ \phantom{CCCC} \downarrow \diagdown \\ \phantom{CCCC} O \phantom{C} OR_1 \end{array}$$

These too are produced by heating a mixture of β-chloromethyl-β-fluoromethyl acrylic acid esters, e.g., ethyl, cyclopentyl esters and the like, with trialkyl phosphites such as triethyl phosphite at a temperature at least above 100° C., preferably between 140° and 150° C. Alkyl chloride is evolved. The product can be isolated by conventional methods such as distillation.

The starting material is produced by reacting 1-fluoro-3-chloroacetone with a triphenylcarbalkoxymethylene phosphine produced in turn by reacting a bromo acetic acid alkyl ester, such as the ethyl ester, with triphenyl phosphine.

Fluorinated ketones which also are included in Formula IV and which react with various intermediates discussed above in the preparation of fluoroisophenols, fluoro vitamin A compounds and fluoro carotenes are those of the formula (XIII)
$$\begin{array}{c} \phantom{CCCCC} O \\ \phantom{CCCCC} \| \\ R_6{-}CH{-}C{-}CH{-}R_7 \\ \phantom{CCC} | \phantom{CCCC} | \\ \phantom{CCC} X \phantom{CCCC} X \end{array}$$

The symbol $R_6$ represents a straight or branched chain alkyl or alkenyl group having at least 5 carbon atoms. There may be up to about 20 carbon atoms in the chain. The alkenyl groups include unsaturated chains having 1 to 5 double bonds. Thus $R_6$ may represent, for example, 4-methylpentane, 4-methyl-3-pentene, 4,8-dimethyl-7-nonene, 4,8-dimethyl-3,7-nonadiene or the like.

$R_7$ represents hydrogen, alkyl, alkenyl, cycloalkyl and cycloalkenyl groups as defined above for $R_3$.

X represents hydrogen or fluorine, at least one X in Formula XIII being the latter.

The new compounds of Formula XIII are produced by alkaline hydrolysis and decarboxylation of fluorinated α-substituted β-keto acid esters of the formula (XIV) 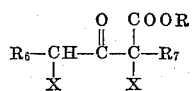

The symbols have the same meaning as previously defined.

These esters used as starting materials are derived from their non-fluorinated counterparts [produced by the method of Ipatiew, Ber. 34, 594 (1901)] which are fluorinated with perchloryl fluoride by the method of Scott et al. (Chemistry and Industry 1960, 528).

The alkaline hydrolysis of the compounds of Formula XIV is carried out in an aqueous medium containing an organic solvent to improve the solubility of the starting material, e.g., alcohols such as methanol or tetrahydrofuran. The reaction temperature is between about room temperature and 100° C., preferably about 60° C. The ketones are isolated by extraction of the alkaline reaction mixture a solvent such as petroleum ether, dialkyl ethers, benzene or dichloromethane.

The new ketones are useful for the preparation of fluoroisoprenoids which have the biological activity previously discussed or are intermediates for such compounds. For example, when $R_6$ represents 4-methylpentane, 4-methyl-3-pentene, 4,8-dimethyl-7-nonene, or 4,8-dimethyl-3,7-nonadiene or the chain is lengthened with an additional $C_5$ isoprenoid unit ($R_7$ being hydrogen), these ketones provide long chain isoprenoids by reaction with an appropriate $C_2$ unit, e.g., triphenylcarbalkoxymethylene phosphine or dialkyl carbalkoxymethyl phosphonate. Other ketones may be prepared when $R_7$ is alkyl, e.g., methyl, ethyl, etc., cycloalkyl, e.g., cyclohexyl or cycloalkenyl, e.g., 2,6,6-trimethylcyclohexenyl.

Various of the compounds discussed above form molecular fragments which may be combined to produce new fluorinated derivatives of the vitamin A series. The fluorinated compounds of the vitamin A series which are of particular interest are those having the formula (XV) 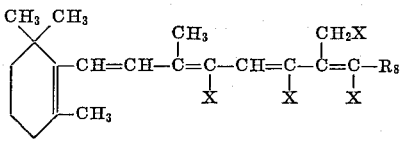

$R_8$ in the above formula is a carbalkoxy group, preferably a carbo-lower alkoxy group such as carbomethoxy, carbethoxy and the like, although longer chain ester groups up to about 18 carbon atoms derived from the fatty acids stearic and palmitic acids, for example, are also within the scope of the formula. $R_8$ also represents the hydroxymethyl group ($CH_2OH$). X represents hydrogen or fluorine, there being at least one fluorine atom in the molecule.

The compounds of Formula XV are preferably produced by reacting a carbonyl compound of the formula (XVI) 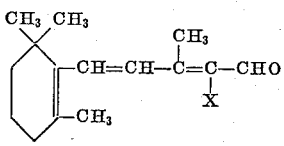

with a carbanion of a $C_5$-phosphonic acid ester of the formula (XVII) 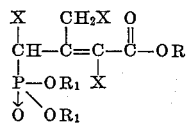

The symbols have the same meanings already defined and at least one X in the Formulas XVI and XVII represents fluorine.

The esters formed by this condensation may be reduced with bimetallichydrides, as lithium aluminum hydride, to form the alcohol (i.e., $R_8$ is hydroxymethyl).

The condensation of XVI and XVII is effected by the addition of the phosphonic acid ester in a solvent such as dialkyl ethers at a temperature between about 0° and 30° C. to a suspension of a metal-containing base such as sodium, sodium hydride or sodium alkoxide in a solvent. In the case of sodium or sodium hydride, dialkyl ethers, tetrahydrofuran, dioxane, or diglyme are suitable solvents. In the case of metal alkoxides, dimethylformamide can be used as solvent. The reaction is completed by stirring in an inert atmosphere, e.g., nitrogen. The reaction requires about 5 to 10 hours for completion at room temperature.

The reaction mixture is worked up by the addition of water and the condensation product is isolated by extraction with an organic solvent such as petroleum or diethyl ether. The crude product may be purified by chromatography on deactivated alumina and elution with cyclohexane.

The reduction of the ester to the corresponding alcohol is preferably effected with lithium aluminum hydride in ether. The temperature depends upon the structure of the ester. In general, a temperature within the range of about −70° to +70° may be used. α-Fluoro esters are generally more resistant to reduction so that higher temperatures in the range are in order while esters with a fluoromethyl group reduce more readily and a low temperature of about −70° C. is desirable in order to avoid defluorination.

The novel compounds of Formula XV are useful as antimetabolites. They have hypocholesteremic activity and may be used for the inhibition of cholesterol biosynthesis and for regulating the level of cholesterol in the blood, e.g., in atherosclerosis or other conditions in which excess cholesterol is a factor. They also may be used as vitamin A antagonists.

The following examples are illustrative of the inventive matter discussed above. All temperatures are expressed on the centigrade scale.

*Example 1.—α-Bromo-α-fluoro acetic acid ethyl ester*

In a polyethylene reaction vessel, 120 g. (6.0 moles) hydrogen fluoride (99% pure) are mixed with 500 ml. dry diethyl ether and 320 g. (1.8 moles) N-bromosuccinimide at −70° with stirring and external cooling. 230 g. (1.8 moles) ethyl diazoacetate are then added. The reaction is complete after 10 hours at −70° and stirring at room temperature for two hours. The precipitated succinimide is filtered, washed with ether and dried.

The filtrate is concentrated by evaporation in vacuo at about 100 mm. Hg and 30° bath temperature. After dropping the concentrate into a stirred mixture of 650 g. (6.5 moles) $KHCO_3$–1.5 l. water, the bromofluoro ester is extracted with ether. After removing the solvent by distillation in vacuo, the distillation of residue yields 195 g. (58% of the theoretical) of α-bromo-α-fluoro acetic acid ethyl ester, boiling at 68°, 34 mm. Hg $n^{20}$ 1.4275.

*Example 2.—α-Bromo-α-fluoro acetic acid ethyl ester*

40 g. (2 moles) of technical, anhydrous hydrofluoric acid are slowly added to 150 ml. of ether in a 250 ml.

polyethylene flask with stirring at −70°. Then 16 gms. (5.1 ml., 0.1 mole) of bromine are added.

To this solution are added dropwise over a period of 30 minutes 22 gms. (0.2 mole) of ethyl diazoacetate at −70° with stirring. After an additional hour at −70°, the temperature was gradually reduced to room temperature. The reaction mixture was then poured into an ice cold, saturated potassium hydrogen carbonate solution and vigorously agitated for 10 minutes. After separation of the phases the aqueous solution was extracted three times with 100 ml. portions of ether. The ether extracts were combined, agitated with dilute potassium hydrogen carbonate solution and then washed twice with water. After drying over magnesium sulfate, the solvent is distilled in vacuo to obtain the same product as in Example 1.

*Example 3.—α-Bromo-α-fluoro acetic acid cyclopentyl ester*

Following the procedure of Example 2 but starting with the cyclopentyl ester yields the corresponding cyclopentyl ester as product.

*Example 4.—Diethyl carbethoxyfluoromethyl phosphonate*

185 g. (1.0 mole) of bromofluoroacetic acid ethyl ester and 216 g. (approx. 1.3 mole) of triethylphosphite (95% purity) are heated in a three-neck flask under stirring slowly at a temperature of 145° C., while the evolved ethylbromide is distilled off on a 10 cm. Vigreux-column. The reaction is completed within about four hours. The lower boiling side-products are removed under a vacuum of about 12 mm. Hg. The subsequent distillation under a high vacuum yields after a small forerun 102 g. of diethyl carbethoxy fluoromethyl phosphonate, boiling point 75° C., 0.01 mm. Hg $n^{19}$=1.4259. The yield is 83% of the theoretical.

$C_8H_{16}FO_5P$ (242.2)—Calcd.: C, 39.70; H, 6.66; F, 7.84.
  Found: C, 39.67; H, 6.68; F, 8.16.

*Example 5.—Ethyl 2-fluoro-3-methyl-crotonate*

72.6 grams (0.3 moles) ethyl carbethoxyfluoromethyl phosphonate are dropped under stirring into a suspension of 7.20 grams (0.3 mole) sodium hydride in dry ether at 0° C. The formation of the sodium salt is completed in three hours. Then 17.5 grams (0.3 mole) of acetone are dropped into the reaction mixture. Sodium diethylphosphonate is precipitated. After heating and refluxing the reaction mixture for one hour, the reaction is interrupted by addition of 250 grams ice and water. The desired fluorocrotonate is extracted with ether. After evaporation of the solvent, the residue distillation in vacuo yields 27.4 grams (62% of the theoretical) ethyl 2-fluoro-3-methyl-crotonate boiling at 61° C., 18 mm. Hg.

UV-Absorption:
  $\lambda_{max}$=222 m$\mu$, log $\epsilon$=4.12 (in methanol).
$C_7H_{11}FO_2$ (146.2)—Calcd.: C, 57.52; H, 7.58; F, 13.00.
  Found: C, 57.36; H, 7.57; F, 13.08.

*Example 6.—Ethyl 2-fluoro-3,7-dimethyl-2,6-octadienoate*

Under the conditions of Example 5, 64.8 grams (0.26 mole) ethyl carbethoxyfluoromethyl phosphonate are added under stirring to a suspension of 6.15 grams (0.26 gram atoms) of finely divided sodium in 250 ml. of dry ether at 0° C. After the reaction is completed and the sodium is dissolved, 31.6 grams (0.26 mole) of 6-methyl-5-heptene-2-one dissolved in 100 cc. ether are added under stirring. The reaction is completed by heated under reflux for about 30 minutes. Working up as in Example 5 yields 32 grams (58% of the theoretical) of ethyl 2-fluoro-3,7-dimethyl-2,6-octadienoate boiling at 66° C., 0.05 mm. Hg.

UV-Absorption:
  $\lambda_{max}$=224 m$\mu$, log $\epsilon$=4.06 (in methanol).
$C_{12}H_{19}FO_2$ (214.3) Calcd.: C, 67.25; H, 8.94; F, 8.87.
  Found: C, 66.97; H, 9.07; F, 9.11.

*Example 7.—Ethyl 2-fluoro-3,7,11-trimethyl-2,6,10-dodecatrienoate*

Under the conditions of Example 5, 25 grams (0.1 mole) of ethylcarbethoxyfluoromethyl phosphonate are added under stirring to a suspension of 2.3 grams (0.1 gram atoms) of sodium in 200 ml. of dry ether at 0° C. After the sodium is dissolved and evolution of hydrogen is completed, 20 grams (0.1 mole) geranyl acetone are dropped into the reaction mixture. By isolating the desired fluoroester as described in Example 5, 14.0 grams (48% of the theoretical) of ethyl 2-fluoro-3,7,11-trimethyl-2,6,10-dodecatrienoate boiling at 83° C., 0.01 mm. Hg are obtained.

UV-Absorption:
  $\lambda_{max}$=224 m$\mu$, log $\epsilon$=4.10 (in methanol).
$C_{17}H_{27}FO_2$ (282.4)—Calcd.: C, 72.31; H, 9.64; F, 6.72.
  Found: C, 72.33; H, 9.72; F, 6.62.

*Example 8.—Ethyl 2,4-difluoro-3,7-dimethyl-2,6-octadienoate*

Under the conditions of Example 5 from 4.8 grams (0.2 mole) sodium hydride and 48.5 grams (0.2 mole) ethyl carbethoxyfluoromethyl phosphonate in 300 ml. dry ether, a solution of the ester sodium salt is prepared. Addition of 28.9 grams (0.2 mole) of 3-fluoro-6-methyl-5-heptene-2-one at 0° and working up as in Example 5 after 12 hours standing at room temperature yields 24.6 grams (53% of the theoretical) of ethyl 2,4-difluoro-3,7-dimethyl-2,6-octadienoate boiling at 48–51° C., 0.05 mm. Hg.

UV-Absorption:
  $\lambda_{max}$=216 m$\mu$, log $\epsilon$=4.13 (in methanol).
$C_{12}H_{18}F_2O_2$ (232.3)—Calcd.: C, 62.05; H, 7.81; F, 16.36.
  Found: C, 62.28; H, 8.01; F, 15.16.

*Example 9.—Ethyl 2,4-difluoro-3-fluoromethyl-crotonate*

Under the conditions of Example 5, 97 grams (0.4 mole) of ethylcarbethoxyfluoromethyl phosphonate are dropped into a suspension of 9.6 grams (0.4 mole) sodium hydride in 120 ml. of dry ether. After the sodium hydride has dissolved, 38 grams (0.4 mole) of 1,3-difluoro-acetone [C.A. 43, 6163e (1949)] diluted with 120 ml. of ether are dropped into the solution with stirring at 0° C. The reaction is completed by standing for 10 hours at room temperature. After the isolation of the trifluoroester as in Example 5, 39 grams (53% of the theoretical) of ethyl 2,4-difluoro-3-fluoromethyl-crotonate boiling at 70–72°, 30 mm. Hg are obtained.

UV-Absorption:
  $\lambda_{max}$=212 m$\mu$, log $\epsilon$=4.14 (in methanol).
$C_7H_9F_3O_2$ (182.1)—Calcd.: C, 46.16; H, 4.98; F, 31.29.
  Found: C, 46.31; H, 5.02; F, 29.82.

*Example 10.—Ethyl β-cyclocitrylidene-fluoroacetate*

Under the conditions of Example 5, 19.4 grams (0.08 mole) of ethyl carbethoxyfluoromethyl phosphonate are dropped into a stirred suspension of 1.92 grams (0.08 mole) sodium hydride in 200 ml. of dry ether. 12.2 grams (0.08 mole) of β-cyclocitral are added at 0° C. The reaction is completed by standing 5 hours at room temperature and working up as in Example 5 to yield 9.8 grams (50% of the theoretical) of ethyl β-cyclocitrylidene-fluoroacetate boiling at 51–53°, 0.01 mm. Hg.

UV-Absorption:
  $\lambda_{max}$=272 m$\mu$, log $\epsilon$=3.36 (in methanol);
  $\lambda_{max}$=203 m$\mu$, log $\epsilon$=3.95.
$C_{14}H_{21}FO_2$ (240.4)—Calcd.: C, 69.97; H, 8.81; F, 7.90.
  Found: C, 69.54; H, 8.80; F, 8.17.

Example 11.—Ethyl β-ionylidene-fluoroacetate

Under the conditions of Example 5, 121 grams (0.5 mole) ethyl carbethoxyfluoromethyl phosphonate are dropped into a suspension of 12 grams (0.5 mole) of sodium hydride in 400 ml. of dry ether at 0°. 96.2 grams (0.5 mole) of β-ionone are then added. The reaction is completed by standing 12 hours at room temperature and heating under reflux for three hours. Working up as in Example 5 yields 57.8 grams (40% of the theoretical) of β-ionylidene-fluoroacetate boiling at 90–93° C., 0.01 mm. Hg.

UV-Absorption:
$\lambda_{max}$=263 m$\mu$, log $\epsilon$=4.04 (in methanol); $\lambda_{max}$=302 m$\mu$, log $\epsilon$=4.07.

$C_{17}H_{25}FO_2$ (280.4)—Calcd.: C, 72.78; H, 8.99; F, 6.77.
Found: C, 72.66; H, 8.99; F, 6.61.

Example 12.—2-fluoro-3,7-dimethyl-2,6-octadien-1-ol (α-fluorogeraniol)

31 g. of ethyl 2-fluoro-3,7-dimethyl-2,6-octadienoate are added dropwise to a suspension of 5.50 g. (0.145 mole) of lithium aluminum hydride in 500 ml. of dry ether at 0° with stirring. The mixture is refluxed for one hour, then treated dropwise at 0° with water-tetrahydrofuran (1:10) until a filtrable precipitate forms and this is then filtered under suction. The precipitate is washed with ether. After drying over magnesium sulfate and distilling off the solvent in vacuo, distillation of the residual oil in vacuo in a Vigreux column, yields 22.5 g. (52% of theory) of 2-fluoro-3,7-dimethyl-2,6-octadien-1-ol, boiling point 0.01, 40–44°; I.R. spectrum: 3620(OH), 1700 (C=C), 1140(C—F), 1000(C—O—C)K. Gas chromatography shows the presence of cis-trans isomers.

$C_{10}H_{17}FO$ (172.2)—Calcd.: C, 69.73; H, 9.94; F, 11.03.
Found: C, 69.70; H, 9.96; F, 11.32.

Example 13.—2-fluoro-3,7,11-trimethyl-2,6,10-dodecatrien-1-ol(α-fluorofarnesol)

15.9 g. (0.056 mole) of ethyl 2-fluoro-3,7,11-trimethyl-2,6,10-dodecatrienoate in 100 ml. of dry ether are added dropwise to a suspension of 1.22 g. (0.032 mole) of lithium aluminum hydride in 300 ml. of dry ether at 0° with stirring. After refluxing for one hour, the reaction mixture is worked up as in Example 12. Distillation of the crude product yields 12.8 g. (94% of theory) of 2-fluoro-3,7,11-trimethyl-2,6,10-dodecatrien-1 - ol, boiling point 86°. Gas chromatography indicates the presence of the cis-trans form. The following bands appear in the I.R. spectrum: 3620, 1700, 1140, 1000, 980, 830.

$C_{15}H_{25}FO$ (240.4)—Calcd.: C, 74.95; H, 10.48; F, 7.90.
Found: C, 74.84; H, 10.36; F, 7.45.

Example 14.—Ethyl β-ionyl-idenefluoroacetate 121 g. (0.5 mole) of diethyl carbethoxyfluoromethyl phosphonate and 12 g. (0.5 mol) of sodium hydride are reacted with 400 ml. of dry ether as described in Example 6. The mixture is cooled to 0° and 96.2 g. (0.5 mol) of β-ionone, admixed with 250 ml. of ether are slowly added dropwise. After a short time diethyl sodium phosphate begins to separate. The reaction mixture is stirred overnight at room temperature and then heated under reflux for 2 hours. The product is worked up as in Example 6. The ether is distilled off and the residue is distilled under high vacuum. The forerun contains a mixture of β-ionone and fluorophosphonate. At a boiling point 90–93° there is obtained 57.8 g. (40% of theory) of ethyl β-ionylidenefluoroacetate as a yellow oil.

UV spectrum:
$\lambda_1$=263 m$\mu$, log $\epsilon$=4.04;
$\lambda_2$=302 m$\mu$, log $\epsilon$=4.07.

$C_{17}H_{25}FO_2$ (280.37)—Calcd.: C, 72.78; H, 8.99; F, 6.77.
Found: C, 72.65; H, 8.99; F, 6.61.

Example 15.—β-ionylidenefluoroethanol 56 g. (0.2 mol) of ethyl β-ionylidenefluoroacetate in 350 ml. of ether are added dropwise over a period of 2 hours to 9.1 g. (0.24 mol) of lithium aluminum hydride in 600 ml. of dry ether at −70° with stirring. After stirring for 12 hours at −70°, the excess lithium aluminum hydride is destroyed with 9 ml. of ethyl acetate and treated with 55 ml. of cold, saturated ammonium chloride solution. Upon stirring, the temperature rises to 20°. The fine crystalline precipitate is filtered off and washed with dry ether. The ether phases are separated to give 46.5 g. of β-ionylidenefluoroethanol (96.57 of theory). For analysis a small portion is distilled to obtain a light yellow oil, boiling point 90–93°.

UV spectrum:
$\lambda_1$=235 m$\mu$, log $\epsilon$=4.10;
$\lambda_2$=264 m$\mu$, log $\epsilon$=4.10.

$C_{15}H_{23}FO$ (238.35)—Calcd.: C, 75.59; H, 9.73; F, 7.97.
Found: C, 75.79; H, 9.67; F, 7.96.

Example 16.—2-fluoro-3,7-dimethyl-2,6-octadien-1-al 8.6 grams (0.05 mol) α-fluorogeraniol dissolved in 200 ml. of petroleum ether are treated with 150 grams activated manganese dioxide with stirring for 1 week under an atmosphere of nitrogen. After filtration and removing the solvent, distillation of the residue yields 6.15 grams of 2-fluoro-3,7-dimethyl-2,6-octadien-1-al boiling at 100–101°, 12 mm. Hg.

UV-Absorption: $\lambda_{max}$=248 m$\mu$, log $\epsilon$=4.14 (in methanol).

$C_{10}H_{15}FO$ (170.2)—Calcd.: C, 70.56; H, 8.88; F, 11.16.
Found: C, 70.35; H, 8.88; F, 11.04.

Example 17.—β-ionylidene fluoroacetaldehyde

Under the condition described in Example 16, 42.8 grams (0.18 mole) β-ionylidene fluoroethanol in 1 liter of petroleum ether are treated at 0° with 200 grams active $MnO_2$ (J. Chem. Soc. 1952, 1094). After stirring 4 days at room temperature in an atmosphere of nitrogen and absence of light, the filtrate is distilled carefully to remove the solvent in vacuo. The oily residue (32.9 grams, 77% of the theoretical) is pure enough for olefination reactions. A small sample upon distillation yields pure β-ionylidene fluoroacetaldehyde boiling at 78–80°, 0.01 mm. Hg.

UV-Absorption:
$\lambda_{max}$=276 m$\mu$, log $\epsilon$=3.92 (in methanol);
$\lambda_{max}$=329 m$\mu$, log $\epsilon$=3.29.

$C_{15}H_{21}FO$ (236.3)—Calcd.: C, 76.23; H, 8.96; F, 8.04.
Found: C, 76.90; H, 9.29; F, 7.02.

Example 18.—3-bromomethyl-2-fluorocrotonic acid ethyl ester 21.9 g. (0.15 mol) of 2-fluoro-3-methyl crotonic acid ethyl ester are admixed with 200 ml. of carbon tetrachloride (distilled over phosphorus pentoxide). To this are added 27.6 g. (0.155 mol) of N-bromosuccinimide and 0.25 g. of azoisobutyronitrile as activator. A heterogeneous mixture is slowly heated in a water bath. At a bath temperature of about 70° the bromination reaction begins and is an exothermic reaction so the heating may be stopped. The reaction is complete in a few minutes. The lighter succinimide collects on the top of the liquid. The mixture is heated for an additional ten minutes, then cooled and the succinimide is filtered off, washed with carbon tetrachloride and the filtrate is filtered in vacuo. The residue is fractionated in a Vigreux column under water vacuum. After a small forerun, 28.0 g. (83% of theory) of 3-bromomethyl-2-fluorocrotonic acid ethyl ester are obtained, boiling point 92–94°.

UV-Absorption: $\lambda_{max}$=228 m$\mu$, log $\epsilon$=4.11.

$C_7H_{10}BrFO_2$ (225.07)—Calcd.: C, 37.36; H, 4.47; F, 8.44. Found: C, 37.56; H, 4.56; F, 8.83.

*Example 19.—Diethyl (3-carbethoxy-3-fluoro-2-methylallyl) phosphonate*

24.1 g. (0.11 mole) of 3-bromomethyl-2-fluorocrotonic acid ethyl ester are slowly heated on an oil bath with 20 g. (0.12 mole) of triethylphosphite. The reaction commences at about 70° bath temperature with evolution of ethyl bromide, which is distilled off on a 10 cm. Vigreux-column. The reaction proceeds very rapidly, so that heating is discontinued. After about 15 minutes the reaction is complete. The reaction mixture is then heated up to 140° with continuous stirring. After cooling unreacted starting material is distilled off in vacuo. The residue is distilled in a high vacuo and 26.2 g. of diethyl (3-carbethoxy-3-fluoro-2-methyl-1 - allyl)phosphonate are obtained boiling between 85 and 88° C., 0.005 mm. Hg. The yield is 87% of the theoretical. In the I.R. spectrum there are bands at 1725 and 1660 cm.$^{-1}$, characteristic for $\alpha,\beta$-unsaturated ester carbonyl groups.

UV-Absorption: $\lambda_{max}$=224 m$\mu$, log $\epsilon$=4.09.

$C_{11}H_{20}FO_5P$ (282.25)—Calcd.: C, 46.81; H, 7.14; F, 6.74. Found: C, 46.65; H, 7.34; F, 7.34.

*Example 20.—Diethyl (3-carbocyclopentyloxy-3-fluoro-2-methyl-1-allyl)phosphonate*

By substituting the cyclopentyl ester for the ethyl ester in the procedure of Example 19, diethyl (3-carbocyclopentyloxy-3-fluoro-2-methyl - 1 - allyl)phosphonate is obtained.

*Example 21.—$\beta$-Fluoromethyl crotonic acid ether ester*

55 g. of (0.33 mol) of ethyl bromacetate is added dropwise with stirring to a solution of 86 g. (0.33 mol) of triphenylphosphine in 400 ml. of dimethylformamide (distilled over phosphorus pentoxide). After standing for 8 hours at room temperature, a solution of 7.6 g. of sodium in 150 ml. of dry ethanol is added. After 15 minutes, 22.8 g. (0.30 mol) of fluoroacetone are added to the neutral ylide solution. After heating for 9 hours at 90° under nitrogen, then cooling, the neutral solution is shaken with 1 liter of water and 100 ml. of petroleum ether. After filtering off under suction the precipitated triphenylphosphine oxide and washing with petroleum ether, the aqueous phase is shaken with petroleum ether. The combined petroleum ether phases, after washing with water and concentration in vacuo, yield 35 g. of crude product. Upon distillation in vacuo in a Vigreux column, 28.5 g. (65% of theory) of $\beta$-fluoromethyl crotonic acid ethyl ester are obtained, boiling point 58–59°.

$C_7H_{11}FO_2$ (146.2)—Calcd.: C, 57.52; H, 7.60. Found: C, 57.48; H, 7.64.

*Example 22.—$\beta$-Fluoro-$\beta$-fluoromethyl crotonic acid ethyl ester*

9.40 g. of 1,3-difluoroacetone are added dropwise to a solution of 34.8 g. (0.1 mol) of triphenylphosphine carbethoxy methylene in 60 ml. of dry benzene, whereupon an exothermic reaction begins. After heating under reflux for 4 hours, cooling and filtering off the precipitated triphenylphosphine oxide, the filtrate is treated with 600 ml. of petroleum ether, cooled to −20° and the remaining crystallized triphenylphosphine oxide is separated by filtration. The solvent is distilled off in vacuo and the residue is distilled in a Vigreux column in vacuo to obtain 12.3 g. (75% of theory) of $\beta$-fluoro-$\beta$-fluoromethyl crotonic acid ethyl ester, boiling point 59–60°.

$C_7H_{10}F_2O_2$ (146.2)—Calcd.: C, 51.22; H, 6.14; F, 23.15. Found: C, 50.90; H, 6.00; F, 22.58.

*Example 23.—Ethyl $\beta$-fluorobromomethyl crotonate*

In a 1 liter three-neck round bottom flask, which is equipped with a condenser, a stirrer and a dropping funnel, are heated 130 grams (0.73 mole) of N-bromosuccinimide and 0.5 gram azo diisobutyronitrile in 700 ml. of dry carbon tetrachloride at a temperature of 80° C. 104 grams (0.71 mole) of $\beta$-fluoromethyl-crotonic acid ethyl ester are added rapidly. The reaction is heated at 80–90° until the reaction starts. The reaction is exothermic and the mixture is not stirred. At the completion of the reaction the succinimide formed floats on the carbon tetrachloride layer. The reaction is complete within 20 minutes. After cooling, the succinimide is filtered off and the filtrate is evaporated in vacuo. Distillation of the residue on a column packed with glass helices yields 133 grams (70% of the theoretical) of ethyl $\beta$-fluorobromomethyl crotonate, boiling point 88–99°, 10 mm. Hg.

UV-Absorption: $\lambda_{max}$=m$\mu$, log $\epsilon$=4.12 (in methanol).

The I.R.-spectrum shows bands at 1715 and 1655 cm.$^{-1}$ characteristic for $\alpha,\beta$-unsaturated ester carbonyl groups.

$C_7H_{10}BrFO_2$ (225.1)—Calcd.: C, 37.35; H, 4.45; Br, 35.48; F, 8.44. Found: C, 37.78; H, 4.56; Br, 33.43; F, 8.01.

*Example 24.—Ethyl $\beta$-fluorobromomethyl-$\beta$-fluoromethyl-acrylate*

Under the conditions described in Example 23, 62.2 grams (0.35 mole) of N-bromosuccinimide in 350 ml. of carbon tetrachloride and 0.5 gram azodiisobutyronitrile are treated at 89–90° by addition of 56 grams (0.34 mole) $\beta$-fluoromethyl-$\beta$-fluoro crotonic acid ethyl ester. Without stirring the reaction is complete in 30 minutes. The reaction is exothermic. Working up as in Example 23 yields 60 grams (72% of the theoretical) of ethyl $\beta$-fluorobromomethyl-$\beta$-fluoromethyl acrylate, boiling point, 92°, 10 mm. Hg.

UV-Absorption: $\lambda_{max}$=212 m$\mu$, log $\epsilon$=4.16.

$C_7H_9BrF_2O_2$ (243.1)—Calcd.: C, 34.59; H, 3.73; Br, 32.88; F, 15.63. Found: C, 34.94; H, 3.75; Br, 33.52; F, 15.37.

By substituting the corresponding cyclopentyl ester for the starting material in the above procedure the corresponding cyclopentyl ester is obtained as product.

*Example 25.—Diethyl (3-carbethoxy-1-fluoro-2-methyl-1-allyl)phosphonate*

43.3 grams (0.26 mole) of triethyl phosphite are mixed at room temperature with 56.3 grams (0.25 mole) of ethyl $\beta$-bromofluoromethyl crotonate and slowly heated up to 150°. The evolving ethyl bromide is distilled off over a Vigreux column. The reaction is complete after 10 hours. The residue is distilled on a column filled with glass helices. The distillation yields 54.6 grams (78% of the theoretical) of diethyl(3-carbethoxy-1-fluoro-2-methyl-1-allyl)phosphonate as a cis-trans mixture boiling at 91°, 0.1 mm. Hg.

UV-Absorption: $\lambda_{max}$= 217 m$\mu$, log $\epsilon$=4.17.

The I.R.-spectrum shows bands at 1710 and 1645 cm.$^{-1}$ characteristic for $\alpha,\beta$-unsaturated ester carbonyl groups.

$C_{11}H_{20}FO_5P$ (282.3)—Calcd.: C, 46.80; H, 7.14; F, 6.73; P.10.98. Found: C, 47.03; H, 7.66; F, 6.79; P, 10.68.

*Example 26.—Diethyl (3-carbethoxy-1-fluoro-2-fluoromethyl-1-allyl)phosphonate*

31.5 grams (0.19 mole) of triethyl phosphite and 46.4 grams (0.19 mole) of $\beta$-fluoromethyl-$\beta$-fluorobromomethyl acrylic acid ethyl ester are mixed at room temperature and gradually heated at 130°. Evolution of ethyl bromide occurs. The reaction is continued for an additional six hours, heating at 160°. After cooling, the residue is distilled in vacuo on a Vigreux column. The yield is 42.1 grams (72% of the theoretical) of diethyl (3-carboethoxy-1-fluoro-2-fluoromethyl - 1 - allyl)phosphonate boiling at 93°, 0.05 mm. Hg.

The I.R.-spectrum shows bands at 1740 and 1645 cm.$^{-1}$ characteristic for an $a,\beta$-unsaturated ester carbonyl group.

$C_{11}H_{19}F_2O_5P$ (300.3).—Calcd.: C, 44.00; H, 6.38; F, 12.66; P, 10.32. Found: C, 44.41; H, 6.41; F, 12.40; P, 10.04.

By substituting the corresponding cyclopentyl ester for the ethyl ester as starting materials in the above procedure, the corresponding cyclopentyl ester is obtained as product.

*Example 27.—β-Fluoromethyl-γ-chlorocrotonic acid ethyl ester*

22.1 g. (0.2 mole) of 1-fluoro-3-chloroacetone [C.A. 43, 6163e (1949)] are added dropwise with stirring to a solution of 4.80 g. (0.2 mole) of sodium hydride in 250 ml. of dry ether and 44.8 g. (0.2 mole) of diethyl carbethoxymethyl phosphonate at 10° to 15°. After stirring for 30 minutes at 40° then standing at room temperature, the reaction mixture is treated with 500 ml. of water, acidified with acetic acid and then extracted with ether. The ether phases are combined, washed, dried and the solvent distilled off. Distillation of the residue in vacuo in a Vigreux column yields 16.1 g. (45% of theory) of β-fluoromethyl-γ-chlorocrotonic acid ethyl ester, boiling point 74°.

$C_7H_{10}ClFO_2$ (180.6)—Calcd.: C, 46.55; H, 5.58; Cl, 19.63; F, 10.52. Found C, 46.88; H, 5.72; Cl, 18.48; F, 10.55.

*Example 28.—Diethyl (3-carbethoxy-2-fluoromethyl-1-allyl)phosphonate*

20 grams (0.11 mole) of β-chloromethyl-β-fluoromethylacrylic acid ethyl ester are mixed with 20 grams (0.12 mole) of triethyl phosphite and the mixture is slowly heated. At a temperature of about 120° the evolution of ethyl chloride commences. The reaction mixture is heated for six hours at a temperature of about 150°. Distillation of the reaction mixture in vacuo on a Vigreux column yields 20 grams (62% of the theoretical) of diethyl (3-carbethoxy-2-fluoromethyl-1-allyl)phosphonate, boiling point 85°, 0.01 mm. Hg. The product is a cis-trans mixture. The compound exhibits an absorption maximum in the UV at 218 mμ, log $\epsilon$=4.16 (in methanol). In the I.R.-spectrum there are bands at 1710 and 1675 cm.$^{-1}$, characteristic for an $\alpha,\beta$-unsaturated ester carbonyl group.

$C_{11}H_{20}FO_5P$ (282.3)—Calcd.: C, 46.80; H, 7.14; F, 6.73; P, 10.89. Found: C, 46.05; H, 7.35; F, 6.30; P, 10.40.

Substitution of the phenyl ester for the ethyl ester as starting material in the above procedure, yields the corresponding phenyl ester as product.

*Example 29.—2-fluoro-2-acetyl-5-methyl-4-hexenoic acid ethyl ester*

396 g. (2.0 moles) of 2-acetyl-5-methyl-4-hexenoic acid ethyl ester are added with stirring and cooling to a solution of 43.7 g. (1.9 gram atoms) of sodium in 1200 ml. of dry ethanol. 204 g. (2.0 moles) of perchloryl fluoride are then added with vigorous stirring and strong cooling. Sodium chlorate begins to separate immediately. After the reaction is complete, the reaction mixture is neutral. Progress of the reaction is followed by gas chromatography. If unchanged starting material is still present in the alcoholic solution further fluorination is effected by addition of 0.2 gram atoms of sodium and 20 g. (0.2 mole) of perchloryl fluoride in order to convert the starting material which is difficult to separate by distillation.

The precipitated sodium chlorate is separated by filtration under suction and washed with dry ethanol. After concentrating the filtrate in vacuo, water is added and the mixture is acidified with acetic acid. The product is shaken with chloroform, then evaporated. Distillation of the residue gives first 2-fluoro-5-methyl-4-hexenoic acid ethyl ester, boiling point 84–87°, then 280 g. (65% of theory) of 2-fluoro-2-acetyl-5-methyl-4-hexenoic acid ethyl ester, boiling point 110°.

$C_{11}H_{17}FO_3$ (216.2)—Calcd.: C, 61.08; H, 7.93; F, 8.79. Found: C, 61.18; H, 7.81; F, 8.63.

*Example 30.—2-fluoro-2-acetyl-5-methylhexanoic acid ethyl ester*

200 g. of ethyl-α-isoamyl acetate are dissolved in a solution of 23 g. (1.0 gram atoms) of sodium in 500 ml. of dry ethanol with stirring and cooling. 112 g. (1.1 moles) of perchloryl fluoride are added. The temperature rises to 15°. The product is worked up as in Example 29. The residual oil is distilled in vacuo yielding first 2-fluoro-5-methyl-hexanoic acid ethyl ester, boiling point 80–82°, then 85.6 g. (39.5% of theory) of 2-fluoro-2-acetyl-5-methylhexanoic acid ethyl ester, boiling point 109–110°.

$C_{11}H_{19}O_3F$ (218.3)—Calcd.: C, 60.51; H, 8.77. Found: C, 60.60; H, 8.88.

*Example 31.—2-fluoro-2-acetyl-5,9-dimethyl-8-decenoic acid ethyl ester*

56.0 g. (0.208 mole) of ethyl α-citronellyl acetoacetate in a solution of 4.8 g. (0.208 gram atoms) of sodium in 170 ml. of dry ethanol are treated with 23.4 g. (0.23 mole) of perchloryl fluoride according to the procedure described in Example 29. Distillation of the residue yields 39.3 g. (66% of theory) of 2-fluoro-2-acetyl-5,9-dimethyl-8-decenoic acid ethyl ester, boiling point 110°.

$C_{16}H_{27}FO_3$ (286.4)—Calcd.: C, 67.20; H, 9.47. Found: C, 67.47; H, 9.51.

*Example 32.—2-fluoro-2-acetyl-5,9-dimethyl-4,8-decadienoic acid ethyl ester*

166 g. (0.62 mole) of ethyl α-geranyl acetate in a solution of 16.2 g. of sodium in 800 ml. of dry ethanol are treated with 64 g. (0.62 mole) of perchloryl fluoride as described in Example 29. Distillation of the residue in vacuo in a Vigreux column yields first 2-fluoro-5,9-dimethyl-4,8-decadienoic acid ethyl ester, boiling point 78°, then 2-fluoro-2-acetyl-5,9-dimethyl-4,8-decadienoic acid ethyl ester, boiling point 95°.

*Example 33.—2-fluoroacetyl-5-methyl-4-hexenoic acid ethyl ester*

256 g. (1.73 moles) of ethyl γ-fluoroacetoacetate (J. Chem. Soc. 1959, 3278) and 258 g. (1.73 moles) of β,β-dimethylallyl bromide are mixed and cooled to −10°. A solution of 39.8 g. of sodium in 800 ml. of dry ethanol is added dropwise. After filtering off under suction the precipitated sodium bromide, washing with ethanol and concentrating the filtrate in vacuo at 40°, water is added, the mixture is acidified with acetic acid and the ester is shaken with chloroform. After washing with water, drying and evaporating the solvent in vacuo, distillation of the residual oil in vacuo in a Vigreux column gives 229 g. (61% of theory) of 2-fluoroacetyl-5-methyl-4-hexenoic acid ethyl ester, boiling point 55–58°.

$C_{11}H_{17}FO_3$ (216.2)—Calcd.: C, 61.08; H, 7.93. Found: C, 61.15; H, 7.80.

*Example 34.—3-fluoro-6-methyl-5-hepten-2-one*

216 grams (1.0 mole) of 2-fluoro-2-acetyl-5-methyl-4-hexenoic acid ethyl ester are heated with stirring in a solution of 48 grams (0.12 mole) of sodium hydroxide in 1.4 liters water and 1.4 liters methanol at 40–50° for 2 hours. After cooling, the 3-fluoro-6-methyl-5-hepten-2-one is extracted with petroleum ether. The combined petroleum ether layers are washed with water, dried and evaporated to remove the solvent. The residue, upon distillation in vacuo, yields 104 grams (72% of the theoretical) of fluoroketone boiling at 57°, 10 mm. Hg.

$C_8H_{13}FO$ (144.2)—Calcd.: C, 66.63; H, 9.08. Found: C, 66.25; H, 8.98.

*Example 35.—3-fluoro-6-methylheptan-2-one*

85.5 grams (0.39 mole) of 2-fluoro-2-acetyl-5-methylhexanoic acid ethyl ester are treated under the condition described in Example 34 with 18.8 grams (0.47 mole) of sodium hydroxide in 2 liters of water-methanol. Working up as in Example 34 yields 44.6 grams (78% of the theoretical) of 3-fluoro-6-methylheptan-2-one boiling at 49°, 10 mm. Hg.

$C_8H_{15}FO$ (146.2)—Calcd.: C, 65.70; H, 10.34. Found: C, 65.59; H, 10.06.

*Example 36.—3-fluoro-6,10-dimethyl-9-undecen-2-one*

53.0 grams (0.18 mole) of 2-fluoro-2-acetyl-5,9-dimethyl-8-decenoic acid ethyl ester are treated under the conditions described in Example 34 with a solution of 8.9 grams (0.22 mole) of sodium hydroxide in 1 liter of water-methanol 1:1. Distillation of the extracted residue yields 29.4 grams (74% of the theoretical) of 3-fluoro-6,10-dimethyl-9-undecen-2-one boiling at 57°, 0.02 mm. Hg.

$C_{13}H_{23}FO$ (214.3)—Calcd.: C, 72.85; H, 10.82. Found: C, 72.82; H, 11.18.

*Example 37.—3-fluoro-6,10-dimethyl-5,9-undecadien-2-one*

84 grams (0.29 mole) of 2-fluoro-2-acetyl-5,9-dimethyl-4,8-decadienoic acid ethyl ester are treated as described in Example 34 with 14.2 grams (0.35 mole) of sodium hydroxide in 1.4 liters water-methanol 1:1 about 3 hours. The yield of 3-fluoro-6,10-dimethyl-5,9-undecadien-2-one is 49.3 grams (78% of the theoretical), boiling point 49°, 0.01 mm. Hg.

$C_{13}H_{21}FO$ (212.3)—Calcd.: C, 73.54; H, 9.97; F, 8.95. Found: C, 74.05; H, 9.79; F, 9.01.

*Example 38.—1-fluoro-6-methyl-5-hepten-2-one*

262 grams (1.2 moles) of 2-fluoroacetyl-5-methyl-4-hexenoic acid ethyl ester are treated under the conditions described in Example 34 with a solution of 58 grams (1.45 moles) of sodium hydroxide in 1500 ml. of water-methanol 1:1 for 4 hours at 60°. Isolation as in Example 34 yields 45.5 grams (26% of the theoretical) of 1-fluoro-6-methyl-5-hepten-2-one boiling at 71–75°, 10 mm. Hg.

$C_8H_{13}FO$ (144.2)—Calcd.: C, 66.64; H, 9.08. Found: C, 66.88; H, 9.19.

*Example 39.—1-fluoro-6,10-dimethyl-5,9-undecadien-2-one*

62 grams (0.22 mole) of 2-fluoroacetyl-5,9-dimethyl-4,8-decadienoic acid ethyl ester are treated under the condition described in Example 34 with a solution of 10.5 grams (0.26 mole) of sodium hydroxide in 1 liter of water-methanol 1:1. Isolation of the 1-fluoro-6,10-dimethyl-5,9-undecadien-2-one as in Example 34 yields 9.03 grams (19.5% of the theoretical) boiling at 55–58°, 0.02 mm. Hg.

$C_{13}H_{21}FO$ (212.3)—Calcd.: C, 73.54; H, 9.97; F, 8.95. Found: C, 73.94; H, 10.11; F, 8.48.

*Example 40.—12-fluoro-vitamin A acid ethyl ester*

21.2 grams (75 moles) of diethyl (3-carbethoxy-1-fluoro-2-methyl-1-allyl)phosphonate are dropped into a suspension of 1.8 grams (75 mmoles) of sodium hydride in 150 ml. of dry ether at 0° with stirring and in an atmosphere of nitrogen. After the reaction is complete, 16.4 grams (75 mmoles) of β-ionylidene acetaldehyde dissolved in 50 ml. of dry ether are added. The reaction mixture is stirred 12 hours at room temperature and in an atmosphere of nitrogen with the exclusion of light. First water then some acetic acid are added to neutralize the still alkaline solution. Extraction of the 12-fluoro vitamin A acid ethyl ester with ether, washing with water and drying with magnesium sulfate and evaporation of the solvent in vacuo in presence of nitrogen yields 20 grams (77% of the theoretical) of yellow oil, which is purified by chromatography on 2 kilograms of alumina ($Al_2O_3$) deactivated with 200 ml. of water. The elution is carried out with cyclohexane. The fractions are controlled by thin layer chromatography on silica gel G (Merck) using a mixture of petroleum ether/benzene 1:1. In the range of $R_f$ 0.6 two spots of the cis-trans isomers of the 12-fluoro vitamin A acid ethyl ester with yellow color are observed. By treatment with a 20% $SbCl_3$ solution in chloroform and heating to about 100° the color of the spots change to red-violet. The fractions containing the fluoro ester are evaporated in vacuo in the presence of nitrogen. The yield of yellow oil is 15.6 g. (60% of the theoretical). For analysis the product is distilled in high vacuo.

UV-Absorption: $\lambda_{max}$=352 mμ, log ε=4.55 (in isooctane).

The I.R.-spectrum shows bands at 1710 and 1610 cm.$^{-1}$.

$C_{22}H_{31}FO_2$ (346.4)—Calcd.: C, 76.26; H, 9.02; F, 5.48. Found: C, 75.95; H, 8.99; F, 5.54.

*Example 41.—13'-flluoro vitamin A acid ethyl ester*

2.4 grams (0.1 mole) of sodium hydride are treated under the conditions of Example 40 with 28.2 grams (0.2 mole) of diethyl (3-carbethoxy-2-fluoro-methyl-1-allyl) phosphonate in 150 ml. of dry ether. After the reaction is complete, 21.8 grams (0.1 mole) β-ionylidene acetaldehyde in 50 ml. of ether are added and the reaction mixture is stirred in an atmosphere of nitrogen for 12 hours at room temperature. Isolation of the 13'-fluoro vitamin A acid ethyl ester and chromatography on deactivated alumina as in Example 40 yields 20.8 grams (60% of the theoretical) of yellow oil showing two spots $R_f$0.6 in thin layer chromatography corresponding to 13-cis-trans isomers.

UV-Absorption: $\lambda_{max}$=355 mμ, log ε=4.60 (in issoctane).

For analysis the compound was distilled in high vacuo.

$C_{22}H_{31}FO_2$ (346.4)—Calcd.: C, 76.26; H, 9.02; F, 5.48. Found: C, 77.00; H, 9.05; F, 5.12.

*Example 42.—12,13'-difluoro vitamin A acid ethyl ester*

1.2 grams (0.05 mole) of sodium hydride are treated under the conditions of Example 40 with 15 grams (0.05 mole) diethyl (3-carbethoxy-1-fluoro-2-fluoromethyl-1-allyl)phosphonate in 200 ml. of dry ether. After the reaction is complete, 10.9 grams (0.05 mole) of β-ionylidene acetaldehyde dissolved in 50 ml. of ether are added and the reaction mixture is stirred in an atmosphere of nitrogen for 12 hours at room temperature. Isolation of the 12,13'-difluoro vitamin A acid ethyl ester and chromatography on deactivated alumina as in Example 40 yields 5.0 grams (27/ of the theoretical) of yellow oil, which shows two spots corresponding to 13-cis-trans isomers in thin layer chromatography $R_f$0.6.

UV-Absorption: $\lambda_{max}$=354 mμ, log ε=4.50 (in isooctane).

$C_{22}H_{30}F_2O_2$ (364.5)—Calcd.: C, 72.50; H, 8.30; F, 10.19. Found: C, 72.92; H, 8.21; F, 9.89.

*Example 43.—10,12-difluoro vitamin A acid ethyl ester*

0.51 gram (21 mmols) of sodium hydride are treated under the condition described in Example 40 with 6.0 grams (21 mmoles) of diethyl (3-carbethoxy-1-fluoro-2-methyl-1-allyl)phosphonate dissolved in 50 ml. of dry ether. After the reaction is complete, 5.0 grams (21 mmoles) of β-ionylidene fluoroacetaldehyde in 5 ml. of dry ether are added and the reaction mixtures is stirred in an atmosphere of nitrogren for 12 hours at room temperature. Isolation of the 10,12-difluoro vitamin A acid ethyl ester and chromatography on deactivated alumina as in Example 40 yields 3.0 grams (39% of the theoretical) of difluoro ester as a yellow oil.

UV-Absorption: $\lambda_{max}$=335 m$\mu$, log $\epsilon$=4.52.

$C_{22}H_{30}F_2O_2$ (364.5—Calcd.: C, 72.50; H, 8.30; F, 10.19. Found: C, 72.81; H, 8.15; F, 9.95.

*Example 44.—14-fluoro vitamin A acid ethyl ester*

2.0 grams (83 mmoles) of sodium hydride are treated in 200 ml. of dry ether under the conditions described in Example 40 with 23.4 grams (83 mmoles) of diethyl (3-carbethoxy-3-fluoro-2-methyl-1-allyl)phosphonate. After the reaction is complete at 0°, 18.0 grams (83 mmoles) of $\beta$-ionylidene acetaldehyde in 50 ml. dry ether are added and the reaction mixture is stirred 4 days in an atmosphere of nitrogen and absence of light at room temperature. Isolation of the 14-fluoro vitamin A acid ethyl ester and chromatography of the isolated 23 grams crude product as in Example 40, yields 10.9 grams (38% of the theoretical) of yellow oil, which shows two spots of cis-trans isomers in thin layer chromatography $R_f$0.6. After addition of 150 ml. of methanol, the solution is cooled to −70° and the crystalline yellow compound is isolated by filtration at −70°. The yield of the recrystallized 14-fluoro vitamin A acid ethyl ester is 4.3 grams, M.P. 87°. The mother liquor contains a mixture of the cis-trans isomers.

UV-Absorption: $\lambda_{max}$=356 m$\mu$, log $\epsilon$=4.65 (in isooctane).

$C_{22}H_{31}FO_2$ (346.5—Calcd.: C, 76.26; H, 9.02; F, 5.48. Found: C, 76.31; H, 9.02; F, 5.62.

*Example 45.—10-fluoro vitamin A acid ethyl ester*

2.4 grams (0.1 mol) of sodium hydride in 150 ml. of dry ether are treated under the conditions described in Example 40 with a solution of 26.4 grams (0.1 mol) of diethyl (3-carbethoxy-2-methyl-1-allyl)phosphonate in 250 ml. of ether. After the reaction is complete at 0°, 23.6 grams (0.1 mol) of $\beta$-ionylidene fluoroacetaldehyde dissolved in 100 ml. of ether are dropped in. The reaction mixture is stirred three days in an atmosphere of nitrogen and in the absence of light. Isolation of the 10-fluoro vitamin A acid ethyl ester and by chromatography on alumina as in Example 40, yields 22 grams (63% of the theoretical) of yellow oil.

UV-Absorption: $\lambda_{max}$=352 m$\mu$, log $\epsilon$=4.57 (in isooctane).

$C_{22}H_{31}FO_2$ (346.5)—Calcd.: C, 76.26; H, 9.02; F, 5.48. Found: C, 76.84; H, 8.84; F, 5.94.

*Example 46.—13'-fluoro vitamin A*

3.7 grams (0.011 mole) of 13'-fluoro vitamin A acid ethyl ester dissolved in 13 ml. of dry ether are dropped in an atmosphere of nitrogen and with stirring into a suspension of 505 mg. (132 moles) of lithium aluminum hydride in 40 ml. of ether at −60°. The fluoroalcohol is isolated under the conditions described in Example 40. After excess of LiAlH$_4$ is destroyed by addition of ethyl acetate and 2.78 ml. of saturated NH$_4$Cl solution in water, the yield of 13'-fluoro vitamin A is 2.65 g. (90% of the theoretical.) The compound shows two spots in thin layer chromatography $R_f$0.34, 0.35 and a blue Carr-Price reaction with SbCl$_3$ in chloroform.

The I.R.-spectrum shows a band at 3620 cm.$^{-1}$ characteristic for hydroxyl.

UV-Absorption; $\lambda_{max}$=322m$\mu$, log $\epsilon$=4.59 (in isooctane) is characteristic for vitamin A.

What is claimed is:
1. A compound of the formula

wherein R$_3$ is a radical of the group consisting of 2,6,6-trimethyl - 1 - cyclohexen - 1 - yl and 2 - (2,6,6 - trimethyl-1-cyclohexen-1-yl)ethenyl, R$_2$ is hydrogen when R$_3$ is 2,6,6-trimethyl-1-cyclohexen-1-yl and R$_2$ is methyl when R$_3$ is 2 - (2,6,6 - trimethyl - 1 - cyclohexen - 1 - yl) ethenyl, and R is lower alkyl.

2. Ethyl $\beta$-cyclocitrylidene fluoroacetate.
3. Ethyl $\beta$-ionylidene fluoroacetate.

References Cited by the Examiner

UNITED STATES PATENTS 2,454,663　11/1948　McGinty _____ 260—487

FOREIGN PATENTS 307,235　8/1955　Switzerland.

OTHER REFERENCES

Bergmann et al.: "J. Chem. Soc." (1961), pp. 4033–4038.

LORRAINE A. WEINBERGER, *Primary Examiner.*

CHARLES B. PARKER, *Examiner.*

F. M. SIKORA, R. K. JACKSON,
　　　　　　　　　　　　　　　*Assistant Examiners.*

UNITED STATES PATENT OFFICE
CERTIFICATE OF CORRECTION

Patent No. 3,277,147                                                October 4, 1966

Hans Machleidt et al.

It is hereby certified that error appears in the above numbered patent requiring correction and that the said Letters Patent should read as corrected below.

In the heading to the printed specification, lines 6, 7 and 8, for "assignors to Olin Mathieson Chemical Corporation, New York, N. Y. a corporation of Virginia" read -- assignors, by mesne assignments, to E. R. Squibb & Sons, Inc., New York, N. Y., a corporation of Delaware --; column 7, line 71, for "heated" read -- heating --; column 11, line 33, for "ether" read -- ethyl --; column 12, line 13, for "133 grams" read -- 113 grams --; column 16, line 41, for "issoctane" read -- isooctane --; line 59, for "27/" read -- 27% --; line 75, for "mixtures" read -- mixture --.

Signed and sealed this 5th day of September 1967.

(SEAL)
Attest:

ERNEST W. SWIDER                                   EDWARD J. BRENNER
Attesting Officer                                Commissioner of Patents